United States Patent
Hong et al.

(10) Patent No.: US 8,634,872 B2
(45) Date of Patent: Jan. 21, 2014

(54) MOBILE TERMINAL FOR DISTINGUISHING AN EAR DURING A CALL AND METHOD THEREOF

(71) Applicant: Samsung Electronics Co., Ltd., Gyeonggi-do (KR)

(72) Inventors: Hyun-Su Hong, Gyeonggi-do (KR); Jeong-Gwan Kwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/650,688

(22) Filed: Oct. 12, 2012

(65) Prior Publication Data
US 2013/0095886 A1    Apr. 18, 2013

(30) Foreign Application Priority Data
Oct. 14, 2011   (KR) ........................ 10-2011-0105482

(51) Int. Cl.
*H04M 1/00* (2006.01)
(52) U.S. Cl.
USPC .................... 455/556.1; 455/575.1; 455/90.1; 455/567; 455/550.1; 381/314

(58) Field of Classification Search
USPC ............... 455/556.1, 575.1, 90.1, 567, 550.1; 381/314
See application file for complete search history.

(56) References Cited

U.S. PATENT DOCUMENTS

| | | | | |
|---|---|---|---|---|
| 7,606,936 | B2 * | 10/2009 | Mousseau et al. | 709/239 |
| 2009/0060240 | A1 * | 3/2009 | Coughlan et al. | 381/314 |
| 2012/0244917 | A1 * | 9/2012 | Hosoi et al. | 455/575.1 |
| 2013/0013315 | A1 * | 1/2013 | Burke et al. | 704/270 |

\* cited by examiner

*Primary Examiner* — Sanh Phu
(74) *Attorney, Agent, or Firm* — The Farrell Law Firm, P.C.

(57) ABSTRACT

A method and apparatus for controlling a mobile terminal based on an ear to which a user puts the mobile terminal in close proximity is provided. The method includes detecting a direction of a movement of the mobile terminal through use of a sensing unit when a call event occurs, determining an ear corresponding to the direction of the movement, and controlling a function of the mobile terminal based on the determined ear. When capturing through a camera is available to determine the direction of the movement, an image captured while the user puts the mobile terminal close to the ear is additionally used. Therefore, whether the ear to which the user puts the mobile terminal in close proximity corresponds to the left ear or the right ear is determined and thus, an operation corresponding to the recognized left or right ear may be performed.

15 Claims, 5 Drawing Sheets

US 8,634,872 B2

MOBILE TERMINAL FOR DISTINGUISHING AN EAR DURING A CALL AND METHOD THEREOF

PRIORITY

This application claims priority under 35 U.S.C. §119(a) to Korean Application Ser. No. 10-2011-0105482, which was filed in the Korean Intellectual Property Office on Oct. 14, 2011, the entire content of which is incorporated herein by reference.

BACKGROUND OF THE INVENTION

1. Field of the Invention

The present invention relates generally to a mobile terminal, and more particularly, to a method and apparatus for distinguishing an ear in contact with a mobile terminal during a call.

2. Description of the Related Art

As communication technologies have developed, functions of mobile terminals have expanded. Various User Interfaces (UIs) and various functions using the same have been provided. Also, the mobile terminal may provide various input schemes to control the various functions.

To utilize the various functions of the mobile terminal, a user may control the mobile terminal through key inputting using keys included in the mobile terminal. Also, the user may control the mobile terminal equipped with a touch screen may through touch inputting a predetermined area of the touch screen.

When the user inputs a call button on the mobile terminal to make a voice call through the mobile terminal, a call connection may be performed. Subsequently, the user may put the mobile terminal close to his/her ear for the call. In this example, a voice of a partner is output through a speaker of the mobile terminal, and a received communication sound may be outputted at a preset volume value. The volume value may be set based on the user requirement by, for example, manipulating a key.

The conventional mobile terminal is controlled by directly providing an input through a predetermined inputting device for controlling the mobile terminal.

As described in the foregoing, in a general mobile terminal, each function provided by the mobile terminal is controlled by merely key inputting or touch inputting. Therefore, each function of the mobile terminal may have limitation in that each function of the mobile terminal is controlled by only key inputting or touch inputting. Also, each function may have simplicity in that it is controlled by only a standardized inputting scheme such as key inputting or touch inputting.

In addition, the mobile terminal outputs a video call sound through a speaker during a video call, and outputs a received communication sound through a receiver during a voice call and thus, a volume value of a type of a call such as a video call or a voice call may be different. Accordingly, when a user fails to recognize that an incoming call is associated with a video call, and puts the mobile terminal close to his/her ear for the call, the video call sound may be output through a speaker. In this example, the video call sound is output at a volume value set to a speaker mode during the video call and thus, the user may be astonished by the sudden loud sound and may be displeased.

Also, when a mode is changed into the speaker mode while the user puts the mobile terminal close to his/her ear and proceeds with a voice call, for example, when a key for switching the mode into the speaker mode is inadvertently pressed by the user, the received communication sound may be output through the speaker before the user takes the mobile terminal sufficiently away from his/her ear. In this example, the user may also be displeased.

Also, calling habits of each user are different and thus, an ear to which the mobile terminal is put close may be different for each user based on the preference for an ear. Also, the hearing may be different. Therefore, manipulating a key to change a volume value based on an ear to which the mobile terminal is put close may be inconvenient for the user. When the mobile terminal is controlled based on an ear to which the user puts the mobile terminal close without a direct input from the user, this may enhance user experience.

SUMMARY OF THE INVENTION

An aspect of embodiments of the present invention is to address at least the problems and/or disadvantages and to provide at least the advantages described below. Accordingly, an aspect of the present invention is to provide a method and apparatus for distinguishing an ear to which a user puts a mobile terminal in close proximity without a direct input from the user during a call.

Another aspect of the present invention is to provide a method and apparatus for recognizing an ear of a user and controlling a mobile terminal based on the recognized ear.

In accordance with an aspect of the present invention, a method for a mobile terminal to distinguish an ear during a call is provided. The method includes determining whether a call event occurs, driving at least one of a sensing unit and a camera so as to detect a movement of the mobile terminal when the call event occurs, and determining whether a proximity of a user's face to the mobile terminal is sensed as the user's face approaches the mobile terminal. The method includes determining a direction of the movement of the mobile terminal based on at least one of sensing data from the sensing unit and a captured image from the camera when the proximity is sensed, determining the ear corresponding to the direction of the movement, and performing a predetermined function corresponding to the determined ear.

In accordance with another aspect of the present invention, a mobile terminal for distinguishing an ear during a call is provided. The mobile terminal includes a sensing unit that is driven when a call event occurs, senses a proximity of a user's face to the mobile terminal as the user's face approaches the mobile terminal, and outputs sensing data for detecting a movement of the mobile terminal when the proximity is sensed. The mobile terminal includes a camera that is driven when the call event occurs, and outputs a captured image obtained until the proximity is sensed. The mobile terminal includes a controller to drive at least one of the sensing unit and the camera when the call event occurs, to determine whether the proximity is sensed as the user's face approaches the mobile terminal, to determine a direction of the movement of the mobile terminal based on at least one of the sensing data from the sensing unit and the captured image from the camera when the proximity is sensed, to determine the ear corresponding to the direction of the movement, and to control a function that is set for the determined ear in advance to be performed.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description, the same elements will be designated by the same reference numerals although they are shown in different drawings. Further, in the following description of the present invention, description of known functions and configurations are omitted to avoid obscuring the subject matter of the present invention.

The present invention provides a method and apparatus for controlling a mobile terminal based on an ear to which a user brings the mobile terminal in close proximity. Embodiments of the present invention include a process of detecting a direction of a movement of the mobile terminal using a sensing unit when a call event occurs, determining an ear corresponding to the direction of the movement, and controlling a function of the mobile terminal based on the determined ear. When capturing through a camera to determine the direction of the movement, an image captured while the user puts the mobile terminal to the ear may be used. Therefore, an ear from among left and right ears that is close to the mobile terminal for a call may be recognized and an operation corresponding to the recognized left and right ears may be performed.

Figure 1:
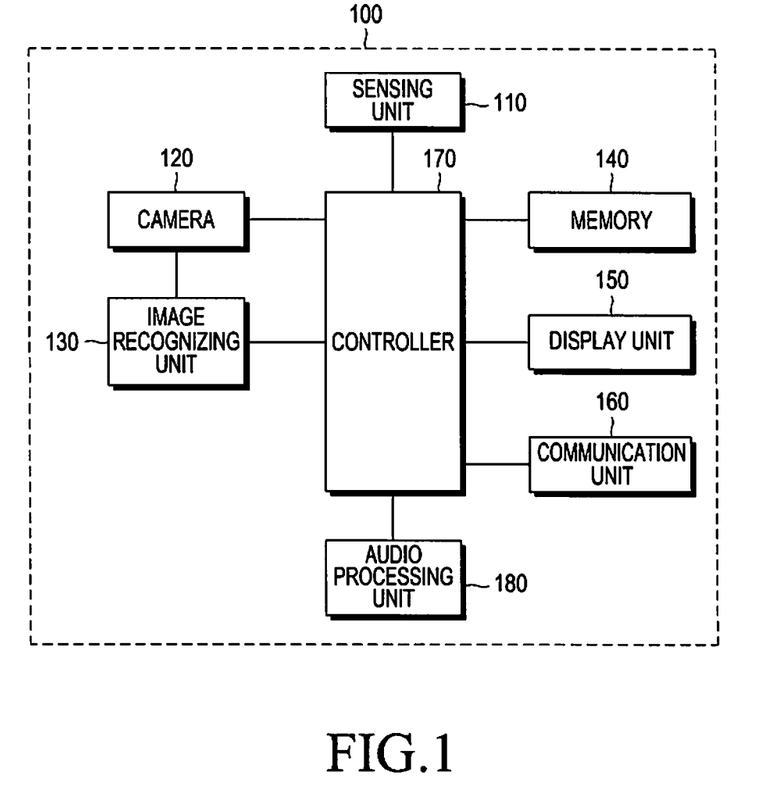
FIG. 1 is an internal block diagram illustrating a mobile terminal, according to an embodiment of the present invention.

FIG. 1 illustrates component elements of the mobile terminal embodying the above mentioned functions and operations.

Referring to FIG. 1, a mobile terminal 100 may include a sensing unit 110, a camera 120, an image recognizing unit 130, a memory 140, a display unit 150, a communication unit 160, a controller 170, and an audio processing unit 180.

The sensing unit 110 includes an inertial sensor such as an accelerometer, a gyroscope, a shock sensor, a tilt sensor, and the like, altimeter, a gravity sensor, or any combination thereof. Embodiments of the present invention may not be limited thereto, and the sensing unit 110 may include another type of a sensor capable of sensing a direction of a movement of the mobile terminal 100.

Sensing data output from the sensing unit 110, that is, movement data, may have a direction and a magnitude. For example, a sensing unit that senses an acceleration of the mobile terminal 100 senses an acceleration with respect to a direction of each reference axis, based on at least one direction or up to three directions (x, y, z axis), and may output the movement data. The reference axis may be an axis associated with a direction of the mobile terminal 100 (for example, up and down (z axis), left and right (x axis), and a front and back (y axis)), or may be an axis associated with a gravitational direction (gravity direction (z axis)) and an axis associated with a direction (x or y axis) vertical to the gravity direction. The sensing unit 110 may further include a calculator (not illustrated) to calculate information including a distance of a movement of the mobile terminal 100, a location, a trajectory, a direction, and the like by integrating a sensed acceleration, such as speed and the like, with respect to a time, and may output the calculated information. The calculator may be included in the controller 170. Also, the calculator may include a frequency filter that blocks or passes a signal of a predetermined band, such as the sensed acceleration and the like, so as to calculate the trajectory, and the like, or to effectively analyze the direction of the movement.

A method in which the sensing unit 110 detects the direction of the movement of the mobile terminal 100 is described with reference to FIGS. 2A and 2B.

Figure 2A:
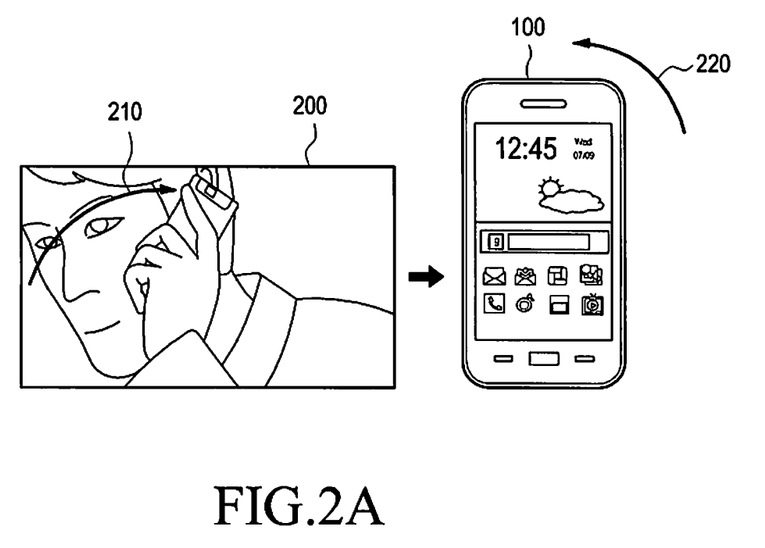
FIGS. 2A and 2B are diagrams illustrating examples of a direction of a movement of a mobile terminal, which corresponds to a case in which the mobile terminal is put close to a left or right ear, according to an embodiment of the present invention.
Figure 2B:
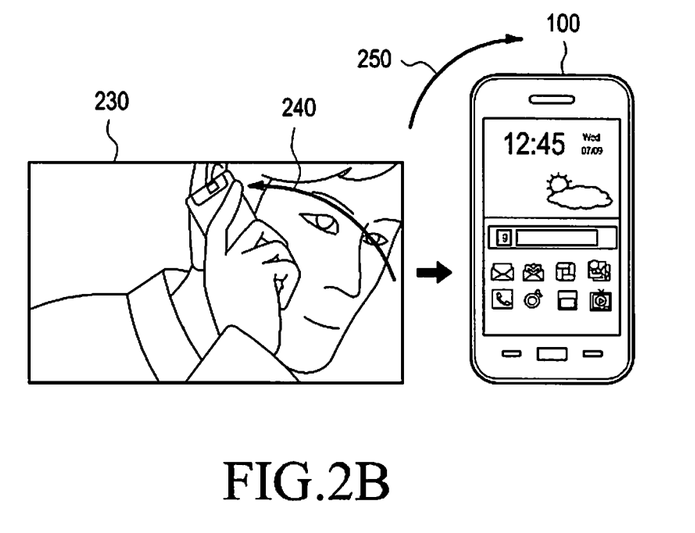

FIGS. 2A and 2B illustrate examples of a motion of a user of putting the mobile terminal 100 close to his or her ear for a call after a call event occurs, according to an embodiment of the present invention. As shown in FIGS. 2A and 2B, a direction of a movement of the mobile terminal 100 may be different depending on whether the mobile terminal 100 moves close to a left ear of the user or where the mobile terminal 100 moves close to a right ear of the user. Sensing data from the sensing unit 110 included in the mobile terminal 100 may be used and movement to a different direction may be sensed for the left ear and the right ear.

Referring to FIG. 2A, when the user puts the mobile terminal 100 close to the left ear of the user in diagram 200, a rotational motion 210 of the mobile terminal 100 may be sensed from the front side of a side of the user's face to the back side of the side of the user's face. In the same manner, when the user puts the mobile terminal 100 close to the right ear of the user as illustrated in the diagram 230 of FIG. 2B, a rotational motion 240 of the mobile terminal 100 may be sensed from the front side of a side of the user's face to the back side of the side of the user's face.

When the rotational motion 210 of the mobile terminal 100 is sensed, the mobile terminal 100 rotates in a direction 220. Therefore, according to an embodiment of the present invention, the direction 220 is defined to be a positive (+) direction. In FIG. 2B, the mobile terminal 100 rotates in a direction 250 when the rotational motion 240 is sensed, and the direction 250 is defined to be a negative (−) direction.

Therefore, the sensing unit 110 outputs sensing data to the controller 170 that is obtained by sensing rotation of the mobile terminal 100 through use of a gyro sensor, an acceleration sensor, and the like. The sensing data indicates a direction of the rotation of the mobile terminal 100, and may correspond one of the positive direction and the negative direction. When the sensing data is transferred to the controller 170, the controller 170 determines that the mobile terminal 100 passes the left side of the user's face and moves close to the left ear when the sensing data indicates the positive direction. Conversely, when the sensing data indicates the negative direction, that is, when movement of the mobile terminal 100 in the negative direction is sensed, the controller 170 determines that the mobile terminal 100 passes the right side of the user's face and moves close to the right ear.

The sensing unit 110 may further include a proximity sensor so as to determine whether the user puts the mobile terminal 100 close to his or her ear. The proximity sensor is a sensor that detects whether an object is approaching the mobile terminal 100 or whether an object around the mobile terminal 100 exists through an electromagnetic field or infrared light without making mechanical contact. Therefore, the proximity sensor outputs a signal by sensing proximity when a face of the user approaches the mobile terminal 100. Examples of the proximity sensor may include a through-scan type sensor, a diffused-reflection type sensor, a retro-reflection type sensor, a high-frequency oscillation-type proximity sensor, a capacitive proximity sensor, a magnetic proximity sensor, an infrared light proximity sensor, and the like.

In the case where a location of the mobile terminal 100 when a call event occurs is regarded as an initial location, the sensing unit 110 senses a movement of the mobile terminal 100 from the initial location and outputs sensing data. The sensing data is output to the controller 170 when the proximity sensor senses that the mobile terminal 100 moves close to an ear of the user.

The camera 120 captures and outputs an external image. Particularly, the camera 120 is driven when a call event occurs, and captures an image while the user puts the mobile terminal 100 close to his or her ear. The camera 120 captures an image in a state where a focal distance is secured before the mobile terminal 100 moves close to the face of the user. Although the call event occurs, whether to capture an image may be determined based on an environment for capturing. For example, only when the brightness of an ambient environment is greater than or equal to a predetermined brightness, the camera may capture an image while the user puts the mobile terminal 100 close to his or her ear. However, when the camera 120 is equipped with an ultraviolet light function that enables night capturing, the camera 120 may proceed with capturing irrespective of ambient illuminance and output the captured image.

The image recognizing unit 130 detects a facial region in the captured image from the camera 120. To detect the facial region, various facial detection algorithms may be applied and the embodiments of the present invention may not be limited to a predetermined facial detection algorithm.

When a facial image analysis based on the captured image is available, that is, when the facial region is detected from the captured image, the detected facial region may be used to determine the direction of the movement of the mobile terminal 100. In particular, the detected facial region may be changed based on the movement of the mobile terminal 100 and thus, a direction of the modification of the facial region may be estimated. To achieve this, the image recognizing unit 130 transfers a facial image including the detected facial region to the controller 170.

The image recognizing unit 130 detects an ear from the detected facial region, and various methods for detecting an ear from the facial region may be used for distinguishing left and right ears of the user. In particular, when the camera 120 is disposed in a marginal portion of the mobile terminal 100, as opposed to a center portion of a top of the mobile terminal 100, for example, and the camera 120 is disposed at a distance of a predetermined interval from the center of the top, a detected ear region may be changed based on an ear to which the mobile terminal 100 is put in close proximity. According to an embodiment of the present invention, the image recognizing unit 130 detects an ear region from the detected facial region, and recognizes, based on an ear image stored in the memory 140, an ear that corresponds to the detected ear region from among the left ear and the right ear.

The memory 140 may be formed of a Read Only Memory (ROM) a Random Access Memory (RAM), and the like, for storing a plurality of programs and information required for controlling operations of the mobile terminal 100. The memory 140 stores various data generated and utilized in the mobile terminal 100. The data may include data generated when an application of the mobile terminal 100 is executed and all types of data that is storable after being generated through use of the mobile terminal 100 or received from an external source. For example, the memory 140 stores an ear image for distinguishing a left ear and a right ear, and stores settings associated with an operation of the mobile terminal 100 which corresponds to each of the left and right ear.

The memory 140 temporarily stores sensing data output from the sensing unit 110 when a call event occurs, under control of the controller 170. Accordingly, the controller 170 takes the temporarily stored sensing data in the memory 170 to use the sensing data for detecting the direction of the movement of the mobile terminal 100. Also, when the camera 120 is driven as a call event occurs, an image captured in real time may be temporarily stored in the memory 170. The image captured in real time may correspond to an external image obtained while the user puts the mobile terminal 100 close to his or her ear. The captured image may be also used for detecting the direction of the movement of the mobile terminal 100, along with the sensing data.

The display unit 150 may be embodied as an LCD panel, and when the LCD panel is embodied as a touch screen type, the display unit 150 may operate as an inputting device. The display unit 150 performs a function of displaying various menus of the mobile terminal, information input by the user, or information provided to the user. In the case of the touch screen, when the user puts the mobile terminal 100 close to his or her ear, the display unit 150 may be turned off so as to prevent inadvertent inputs. However, when the display unit 150 is not embodied as the touch screen, according to an embodiment of the present invention, the display unit 150 may be embodied to output an optimized user interface screen to correspond to each of the left and right ears under control of the controller 170, providing an example of the case where control of a function of the mobile terminal 100 is based on an ear to which the user puts the mobile terminal 100 in close proximity.

The communication unit 160 is connected to the controller 170. The communication unit 160 converts audio data and control data into a wireless signal for transmission, and receives the wireless signal and converts the wireless signal into audio data and control data for outputting.

The audio processing unit 180 is connected to the controller 170 and converts the audio data from the controller 170 into an audible sound so as to output the audible sound through a speaker. The audio processing unit 180 converts an audio signal received from a microphone into data so as to transfer the data to the controller 170. According to an embodiment of the present invention, as an example of the case in which a function of the mobile terminal 100 is controlled based on an ear to which the user puts the mobile terminal 100 in close proximity, the audio processing unit 180 may be embodied to output an audio signal at an optimized volume value corresponding to each of the left and right ears. The volume value corresponding to each ear may be preset by the user. As another example, the audio processing unit 180 may also be embodied to output an audio signal at a balance corresponding to a corresponding ear, as in the earphones that consider a left and right balance. Also, when the user puts the mobile terminal 100 close to his or her ear while a video call sound associated with a video call is being output through the speaker, the audio processing unit 180 may be embodied to output an audio signal at a volume value set for a corresponding ear, as opposed to a volume value set to a speaker mode. In this example, the user may proceed with a voice call without separate manipulation of a volume.

The controller 170 controls general operations of the mobile terminal 100 and a signal flow among the component elements. The controller 170 outputs a control signal so that a predetermined function corresponding to each of the left and right ears is performed.

In particular, the controller 170 determines the direction of the movement of the mobile terminal 100 based on sensing data from the sensing unit 110, and estimates an ear corresponding to the direction of the movement. In this example, the controller 170 may additionally use a captured image from the camera 120 to determine the direction of the movement. For this, the image recognizing unit 130 analyzes the captured image from the camera 120 mounted on the mobile terminal 100 so as to detect a side of the user's face. Based on a result of detecting the side of the user's face, when the mobile terminal 100 senses movement from the front side of the side of the user's face to the back side of the side of the user's face or from the back side of the side of the user's face to the front side of the side of the user's face, the controller 170 combines sensing data. That is, the sensing data includes positive and negative direction information of the mobile terminal 100 combined with facial image information associated with the detected side of the user's face to accurately determine whether the mobile terminal 100 moves close to the left ear or the right ear of the user. Criterion of the determination is as shown in Table 1.

TABLE 1

| Sense direction of movement based on sensing unit or sense movement based on image | + | − |
|---|---|---|
| Sense movement from the front side of the side face to the back side of the side face | Left ear | Right ear |
| Sense movement from the back side of the side face to the front side of the side face | Right ear | Left ear |

An operation of the mobile terminal configured as described in the foregoing is described with reference to FIG. 3.

Figure 3:
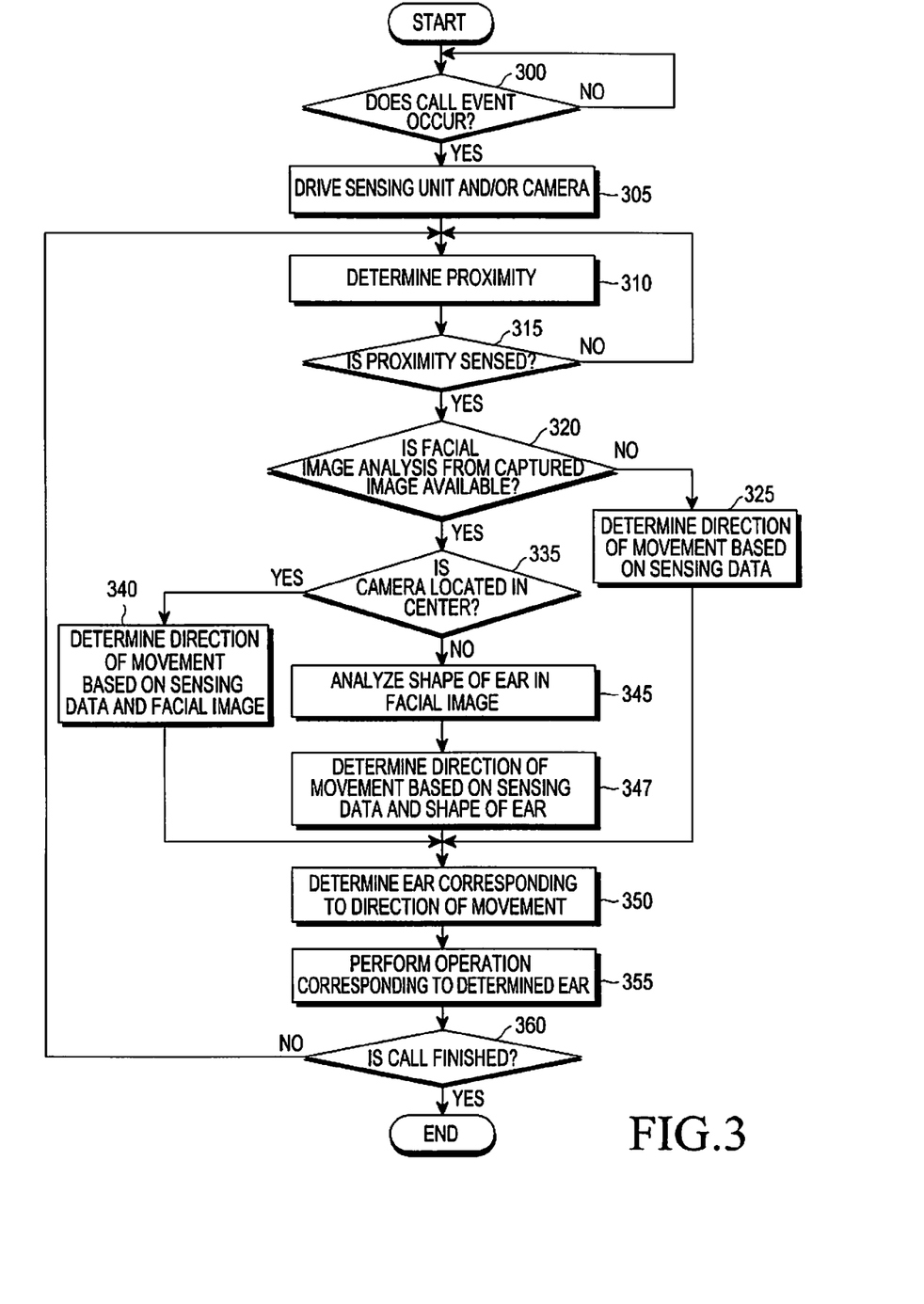
FIG. 3 is an operation flowchart illustrating a mobile terminal for distinguishing a left or right ear, according to an embodiment of the present invention.

Referring to FIG. 3, the mobile terminal 100 determines whether a call event occurs in step 300. Here, occurrence of the call event may include a case in which a user presses a call button for sending a call or receives a call, a case in which a user presses a call button to start a call associated with a received call, and the like.

When the call event occurs, the mobile terminal 100 drives the sensing unit 110 and/or the camera 120 in step 305. In step 305, a direction of a movement may be determined based on sensing data from the sensing unit 110 and thus, only the sensing unit 110 may be driven. However, an operation when both the sensing unit 100 and the camera 120 are driven is described herein.

When the sensing unit 110 and/or the camera 120 is driven, sensing data output from the sensing unit 110 and a captured image from the camera 120 may be temporarily stored in the memory 140 until a proximity of the mobile terminal 100 to the user is determined.

Subsequently, the mobile terminal 100 determines the proximity to determine whether the user put the mobile terminal 100 close to his or her face. When the proximity is not sensed, the mobile terminal 100 returns to step 310 so as to repeatedly determine the proximity. When the proximity is sensed in step 315, the mobile terminal 100 determines whether a facial image analysis based on the temporarily stored captured image is available in step 320. For example, when the capturing is performed in a dark place, determining whether a facial region exists in the captured image may be difficult and thus, whether facial image analysis is available is determined.

When the facial image analysis is unavailable, the mobile terminal 100 proceeds to step 325 to determine the direction of the movement through use of the sensing data without using the captured image from the camera 120. Subsequently, in step 350, whether an ear corresponding to the direction of the movement of the mobile terminal 100 is the left ear or the right ear is determined. Conversely, when the facial image analysis is available, the mobile terminal 100 determines whether a location of the camera 120 is in the center of the mobile terminal 100 in step 335. When the location of the camera 120 is in the center, the mobile terminal 100 determines the direction of the movement based on the sensing data and a facial image in step 340. In particular, the mobile terminal 100 detects a facial region in the captured image, determines a direction of a movement of the detected facial region, and combines the determined direction of the movement and the sensing data so as to determine the direction of the movement of the mobile terminal 100. The mobile terminal 100 determines an ear of the user corresponding to the direction of the movement in step 350. In step 355, an operation is performed corresponding to the determined ear. In this example, the mobile terminal 100 may refer to Table 1 to determine the ear of the user corresponding to the direction of the movement.

Figure 4:
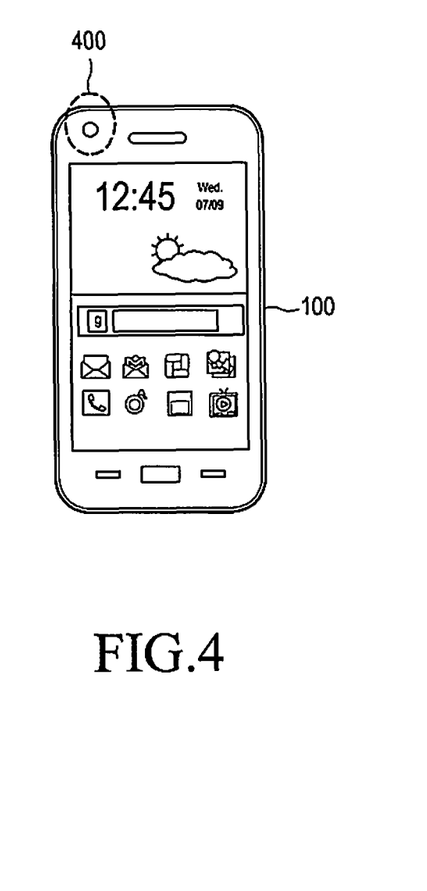
FIG. 4 is a diagram illustrating an example of a location of a camera used in a mobile terminal, according to an embodiment of the present invention.
Figure 5A:
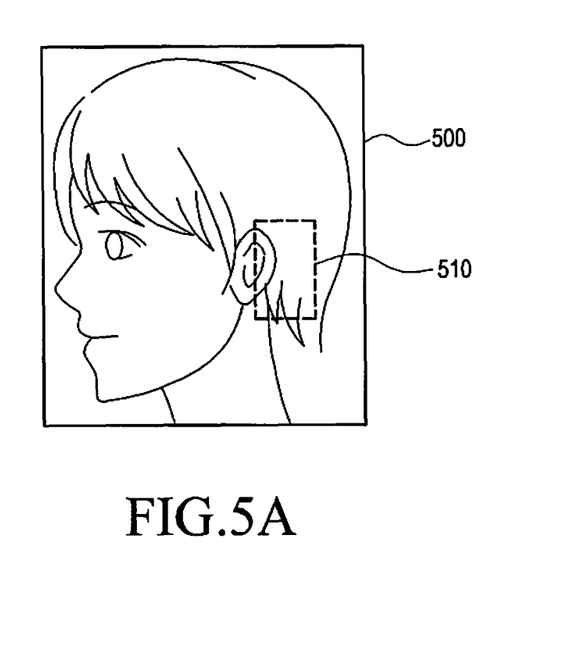
FIGS. 5A and 5B are diagrams illustrating a method for distinguishing an ear based on a location where a camera of a mobile terminal is mounted, according to an embodiment of the present invention.
Figure 5B:
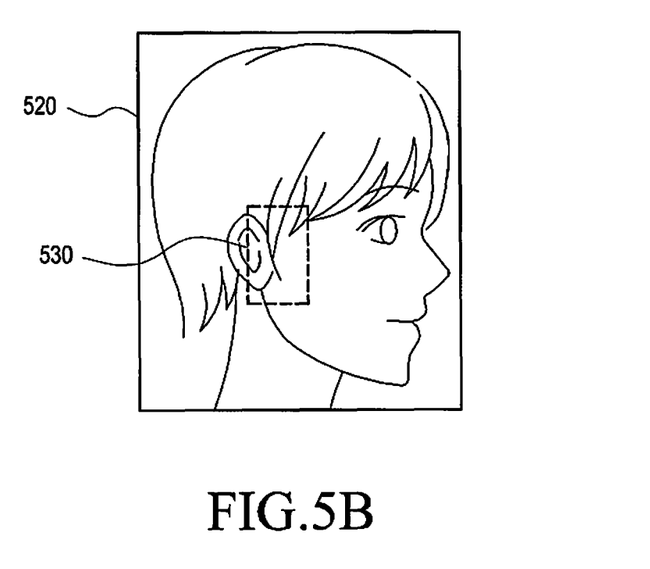

When the camera 120 is mounted in a location 400 that is different from the center as illustrated in FIG. 4, a captured region of the camera 120 may be changed as shown in FIGS. 5A and 5B. Therefore, the mobile terminal 100 analyzes a shape of an ear of the facial image in step 345. The mobile terminal 100 determines the direction of the movement based on the sensing data, the facial image, and the shape of the ear in step 347 so as to determine the ear corresponding to the direction of the movement in step 350. That is, when the direction of the movement is determined based on the sensing data and the facial image referring to Table 1, and the camera 120 is disposed in a location different from the center of the mobile terminal 100, an analysis of a shape of an ear may additionally be used.

In FIG. 5A, when a user moves the mobile terminal 100 close to his or her left ear, a captured region 510 of a camera in a facial image 500 corresponds to a back part of the ear. Accordingly, when the back part of the ear is captured, the mobile terminal 100 determines the captured region as a left ear based on an image of an ear stored in the memory 140. In FIG. 5B, when the user puts the mobile terminal 100 close to his or her right ear, a captured region 530 of the camera in a facial image 520 corresponds to a fore part of the ear. When the captured region is recognized to be a fore part of an ear, the mobile terminal 100 determines the captured region to be the right ear. Shapes of the fore part of an ear and the back part of the ear are different from each other, and thus, an ear may be readily distinguished based on the difference.

Upon determining whether an ear is the left ear or the right ear, the mobile terminal 100 performs a preset operation that is set for the determined ear in advance. The preset operation may include an operation of outputting an audio signal at an optimized volume value corresponding to each of the left and right ears and an operation of outputting an audio signal at a balance corresponding to the corresponding ear as in the earphones that consider a left and right balance. As another example, the mobile terminal 100 may perform an operation of outputting an audio signal through a receiver at a volume value set for the corresponding ear, as opposed to a volume value set to a speaker mode when the user puts the mobile terminal 100 close to his or her ear while a video call sound associated with a video call is being output through a speaker.

A different operation for each of the left and right ears may be set to be performed, and the settings associated with a function to be controlled based on the determined ear may be changed by the user.

Subsequently, the mobile terminal 100 returns to step 310 when the call is not finished in step 360. The user may take the mobile terminal 100 away from his or her ear for a while, and then put the mobile terminal 100 close to his or her ear again and proceed with the call. When the mobile terminal 100 is away from an ear of the user, a distance may be sensed by a proximity sensor and thus, determination on whether the user moves the mobile terminal 100 again to put it close to his or her ear and determination during the movement may be performed, which correspond to repetition of the previously described method. That is, the method for the determination of whether the user moves the mobile terminal 100 again to his or her ear after taking the mobile terminal 100 away from his or her ear for a while may be applied as described with reference to FIG. 3. Conversely, when the user performs a call without putting the mobile terminal 100 close to his or her ear, proximity may be continuously sensed through use of a proximity sensor. Accordingly, a position of the mobile terminal 100 is continuously estimated and thus, the movement of the mobile terminal 100 may be sensed. According to the embodiments of the present invention, the mobile terminal 100 may be controlled by an ear to which the mobile terminal 100 is put in close proximity without a direct input from the user.

According to the embodiments of the present invention, the mobile terminal may be controlled based on a result of distinguishing an ear of the user without a direct input from the user, and thus, convenience may be improved while the mobile terminal 100 is used. Also, the embodiments of the present invention distinguish the case in which the user uses his or her left ear for the mobile terminal 100 and the case in which the user uses the right ear for his or her mobile terminal and thus, may provide a User Interface (UI) of which usability is improved based on a condition of the left and right ears, calling habits of the user, and the like or a new User eXperience (UX).

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for a mobile terminal to distinguish an ear during a call, the method comprising:
   determining whether a call event occurs;
   driving at least one of a sensing unit and a camera to detect a movement of the mobile terminal when the call event occurs;
   determining whether a proximity of a user's face to the mobile terminal is sensed as the user's face approaches the mobile terminal;
   determining a direction of the movement of the mobile terminal based on at least one of sensing data from the sensing unit and a captured image from the camera when the proximity is sensed;
   determining the ear corresponding to the direction of the movement; and
   performing a predetermined function corresponding to the determined ear.

2. The method of claim 1, wherein, when the camera is driven, the method further comprises:
   detecting a facial region from a captured image obtained until the proximity is sensed.

3. The method of claim 2, wherein determining the direction of the movement of the mobile terminal comprises:
   determining a direction of a movement of the detected facial region; and
   determining the direction of the movement of the mobile terminal based on the determined direction of the movement of the detected facial region.

4. The method of claim 1, wherein, when the camera is mounted at a distance of a predetermined interval from the center of the top of the mobile terminal, the method further comprises:
   determining whether an ear region in the captured image corresponds to a back part of the ear or a fore part of the ear;
   recognizing the determined ear to be a left ear when the ear region corresponds to the back part of the ear; and
   recognizing the determined ear to be a right ear when the ear region corresponds to the fore part of the ear.

5. The method of claim 1, wherein the sensing unit comprises at least one of an accelerometer, a gyroscope, a shock sensor, a tilt sensor, and a proximity sensor, for sensing the movement of the mobile terminal.

6. The method of claim 1, wherein performing the function corresponding to the determined ear comprises:
   outputting an audio signal associated with the call at a volume value that is set for the determined ear in advance.

7. The method of claim 1, wherein performing the function corresponding to the determined ear comprises:
   outputting an audio signal associated with the call at a balance that is set for the determined ear in advance.

8. The method of claim 1, wherein performing the function corresponding to the determined ear comprises:
   when the call is a video call, outputting an audio signal through a receiver at a volume value corresponding to the determined ear while a video call sound associated with the video call is being output through a speaker.

9. A mobile terminal for distinguishing an ear during a call, the mobile terminal comprising:
   a sensing unit that is driven when a call event occurs, senses a proximity of a user's face to the mobile terminal as the user's face approaches the mobile terminal, and outputs sensing data for detecting a movement of the mobile terminal when the proximity is sensed;
   a camera that is driven when the call event occurs and outputs a captured image obtained until the proximity is sensed; and
   a controller to drive at least one of the sensing unit and the camera when the call event occurs, to determine whether the proximity is sensed as the user's face approaches the mobile terminal, to determine a direction of the movement of the mobile terminal based on at least one of the sensing data from the sensing unit and the captured image from the camera when the proximity is sensed, to determine the ear corresponding to the direction of the movement, and to control a function that is set for the determined ear in advance to be performed.

10. The mobile terminal of claim 9, further comprising:
an image recognizing unit to detect a facial region from the captured image obtained until the proximity is sensed when the camera is driven.

11. The mobile terminal of claim 10, wherein the controller determines a direction of a movement of the facial region detected by the image recognizing unit, and determines the direction of the movement of the mobile terminal based on the determined direction of the movement of the facial region.

12. The mobile terminal of claim 9, wherein, when the camera is mounted at a distance of a predetermined interval from a center of a top of the mobile terminal, the controller determines whether an ear region in the captured image from the camera corresponds to a back part of the ear or a fore part of the ear, recognizes the determined ear to be a left ear when the ear region corresponds to the back part of the ear, and recognizes the determined ear to be a right ear when the ear region corresponds to the fore part of the ear.

13. The mobile terminal of claim 9, wherein the sensing unit comprises at least one of an accelerometer, a gyroscope, a shock sensor, a tilt sensor, and a proximity sensor.

14. The mobile terminal of claim 9, wherein the controller performs controlling to output an audio signal associated with the call at a volume value that is set for the determined ear in advance.

15. The mobile terminal of claim 9, wherein, when the call is a video call, the controller performs controlling to output an audio signal through a receiver at a volume value corresponding to the determined ear while a video call sound associated with the video call is being output through a speaker.

* * * * *